United States Patent [19]

D'Amico et al.

[11] Patent Number: 4,842,874

[45] Date of Patent: * Jun. 27, 1989

[54] COMPOSITION FOR PREPARING FREEZE-THAW MICROWAVEABLE PRE-FRIED FOODSTUFFS

[75] Inventors: Louie R. D'Amico, Flemington; Susan E. Waring, Belle Meade; Julianne M. Lenchin, Cranbury, all of N.J.

[73] Assignee: National Starch and Chemical Corporation, Bridgewater, N.J.

[ * ] Notice: The portion of the term of this patent subsequent to Oct. 18, 2005 has been disclaimed.

[21] Appl. No.: 128,965

[22] Filed: Jan. 29, 1988

Related U.S. Application Data

[62] Division of Ser. No. 883,259, Jul. 8, 1986, Pat. No. 4,778,684.

[51] Int. Cl.$^4$ ............................................. A23D 1/08
[52] U.S. Cl. .................................... 426/94; 426/291; 426/302
[58] Field of Search ............... 426/552, 553, 554, 555, 426/92, 94, 89, 289, 291, 296, 321, 531, 302, 622, 658

[56] References Cited

U.S. PATENT DOCUMENTS

| | | | |
|---|---|---|---|
| 2,721,142 | 10/1955 | Shinn | 426/92 |
| 3,147,122 | 9/1964 | Williams | 426/55 |
| 3,506,455 | 4/1970 | Savage et al. | 426/296 |
| 3,794,742 | 2/1974 | Harris et al. | 426/92 |
| 4,199,603 | 4/1980 | Sortwell, III | 426/296 |
| 4,208,442 | 6/1980 | Evans et al. | 426/555 |
| 4,504,509 | 3/1985 | Bell et al. | 426/553 |
| 4,529,607 | 7/1985 | Lenchen et al. | 426/92 |
| 4,595,597 | 6/1986 | Lenchen et al. | 426/652 |
| 4,640,837 | 2/1987 | Coleman et al. | 426/302 |
| 4,675,197 | 6/1987 | Banner et al. | 426/292 |

OTHER PUBLICATIONS

Food Technology, Feb. 1985, METHOCEL advertisement
METHOCEL Premium Food Gums brochure, the Dow Chemical Company Copyright 1986, pp. 1–12.
Hawley et al., 1971, IFST Proceedings 4(2) 71, Abstract.
Hill 1977, IFST Proceedings 10(4) 157, Abstract.

Primary Examiner—Donald E. Czaja
Assistant Examiner—Carolyn Paden
Attorney, Agent, or Firm—Edwin M. Szala; Lori D. Tolly

[57] ABSTRACT

Batter coated, pre-fried microwaveable foodstuffs characterized by improved freeze/thaw stability are provided by employing as a dry predust, prior to batter application, a composition comprising greater than 20%, by weight, of an hydroxypropylmethyl cellulose ether having a methoxyl content greater than 22% and an hydroxypropyl content of at least 5%, by weight.

6 Claims, No Drawings

COMPOSITION FOR PREPARING FREEZE-THAW MICROWAVEABLE PRE-FRIED FOODSTUFFS

This application is a division of application Ser. No. 883,259, filed July 8, 1986, now U.S. Pat. No. 4,778,684.

BACKGROUND OF THE INVENTION

This invention relates to the use of a dry predust comprising an effective amount of a hydroxypropylmethyl cellulose derivative and the improved freeze/thaw stability provided to breaded and non-breaded convenience foodstuffs which are coated with the predust prior to the application of an aqueous batter mix, pre-fried, frozen, and ultimately cooked in a microwave oven.

Batter coated fried foods have a broad appeal. Among the most popular batter coated foods are fried chicken and fish as well as other meat products, however, a wide variety of other foods, such as vegetables, and even fruits can be coated and then cooked by frying. Deep-fried food batters, whether for use with fresh or frozen foods, consist primarily of farinaceous materials such as starches and/or flours along with other optional ingredients such as egg solids, baking powder, cream of tartar, preservatives, seasonings, coloring matter and milk solids. These mixtures are combined with water so as to obtain a desired coating viscosity whereupon they are applied to the food ordinarily by means of a dip, spray or cascade technique. Before frying, the batter coated food may be coated with a breading such as corn meal, cracker crumbs, bread crumbs or the like if so desired.

Prior to batter application, a foodpiece often will undergo a predusting step. Predusting has primarily been performed in order to create a surface which is more conducive to the physical adhesion of a wet batter. Applying a predust has always been a challenge in the coating industry because of the need to apply a thin, uniform layer. Where absent, the batter will not adhere evenly to the foodpiece. Similarly, the batter is unable to hydrate large lumps of the predust resulting in batter film break away causing voids in these areas.

Typical predust materials have included farinaceous-based materials such as very fine cereal flour, a flour combination, starch or the dry batter itself.

In order to obtain a fried product, a batter-coated food piece must be cooked in the presence of frying oils or melted fat at elevated temperatures. Foods thus prepared may be immediately consumed or may be packaged and quick frozen so that the ultimate consumer may prepare the foodstuff merely by reheating. In many cases, the food may only receive a partial cooking or "pre-frying" at this point, whereupon it is packaged and quick frozen with the cooking of the pre-fried frozen foodstuff completed at a later time by the consumer.

A growing trend to spend less time on food preparation has lead to a great demand for time-saving "ready-to-heat" frozen food products now on the market. The wide use of microwave ovens, now a standard feature in many homes and restaurants, has further led to the reduction in cooking time spent by consumers. Many products cooked by means of microwaving or baking are indistinguishable from each other. Unfortunately, frozen pre-fried foodstuffs have shown strong differences when comparisons are made between final products which have been fried, baked and most particularly microwaved. Microwaved pre-fried products have tended to be undesirably soggy, and as such have not been recommended for microwaving.

It had generally been accepted that frozen pre-fried products which were subsequently cooked by microwave radiation would be inferior in crispness to those products cooked in an oven. There are at least two reasons for which the inferiority of the microwaved products has been attributed.

Firstly, the transfer of heat to a food piece during frying or baking is opposite that for microwaving. Microwave radiation cooks food pieces by heating the water contained therein which in turn acts to cook the entire piece. For this reason, it is often explained that microwave radiation cooks products from the interior outwards, resulting in the coating of a pre-fried piece being the last part to be cooked. During microwaving, the moisture in the food piece is driven outwards towards the surface, which can cause the food piece to become soggy. During frying or baking, on the other hand, the outer coating receives the most exposure to cooking temperatures while the interior receives the least, thus providing a crispy outer coating.

Secondly, food pieces which are cooked in the presence of hot fat or oil by frying are usually cooked at temperatures of at least 350° F. (176° C.) to about 425° F. (218° C.) preferably 375°–395° F. (190°–202° C.) which are sufficiently high to fry the food piece. It is recommended that pre-fried food pieces be oven baked at comparable frying temperatures so that residual oil, contained on the surface of all pre-fried foods, will continue to cook the food piece. Microwave ovens, on the other hand, are limited to cooking temperatures such that the residual oil retained on a food piece after pre-frying will not continue to cook the piece.

In addition to crispness, another desirable property of a microwaved pre-fried product is an undifferentiable interface between the batter coating and the food piece. The crispness of a food piece becomes overshadowed as the interface worsens by going from thin and dry to floury, bready and finally to pasty. Weepage is also an important concern. Fluid migration during freezing or microwaving due to gravity may result in the pooling of some fluid on the underface of the product resulting in a product which is soggy beneath a crispy coating.

U.S. Pat. Nos. 4,529,607 and 4,595,597 (issued on July 16, 1985 and June 17, 1986 respectively to J. Lenchin et. al.) disclose a batter mix formulation for coating pre-fried microwavable foodstuffs. The batter mix, which advantageously employs about 50 to 80% of a high amylose flour, based on batter mix solids, provides a crispy pre-fried foodstuff which remains crispy after freezing and subsequent subjection to microwave cooking. The disclosures of the above references are hereby incorporated herein by reference.

Most frozen pre-fried, convenience food products are produced and packaged to have an optimum shelf life of about three months. During this time period, it is not uncommon for storage temperatures to fluctuate causing the frozen products to undergo one or more partial or complete freeze/thaw cycles during transportation and storage. Due to the deleterious effect repeated freezing and thawing cycles has on a frozen pre-fried foodpiece causing a significant exudation of moisture therefrom, the freeze/thaw stability of a product is a serious concern in the frozen food industry.

Freeze/thaw stability of a pre-fried foodpiece is especially important for products ultimately reconstituted by microwave cooking. As discussed above, the high cooking temperatures of oven reconstitution enables a significant amount of moisture present on the exterior of a foodpiece which could result in a soggy product to be removed. Microwave cooking, on the other hand, is conducted at a temperature which does not allow for easy removal of excess water pooled on the underface of the product.

Frozen pre-fried chicken pieces prepared employing a conventional predust and the batter mix of J. Lenchin et al. (described above) are unable to withstand one freeze/thaw cycle with the pre-fried coating exhibiting a poor interface with severe weepage.

There is therefore a need in the convenience food industry for a method of providing freeze/thaw stable microwavable pre-fried foodstuffs. The ability to provide a microwaveable pre-fried chicken piece which is able to withstand three freeze/thaw cycles would be recognized in the convenience food industry as a significant improvement.

Accordingly, it is an object of the present invention to provide a dry predust which is capable of improving the shelf-stability of a microwaveable pre-fried foodstuff.

It is further an object to provide a method for preparing a microwaveable pre-fried foodstuff which is capable of withstanding repeated freeze/thaw cycles.

SUMMARY OF THE INVENTION

The present invention provides an improved process for preparing a freeze/thaw stable batter coated, pre-fried microwaveable foodstuff. By applying a batter formulation capable of providing a pre-fried foodstuff with acceptable crispness after subjection to microwave cooking and, prior to batter application, applying a dry predust comprising greater than 20% by weight of an hydroxypropylmethyl cellulose ether having a methoxyl content greater than 22% and an hydroxypropyl content of at least 5%, an acceptable microwaveable pre-fried foodstuff is provided which is capable of withstanding repeated freeze/thaw cycles.

The predust preferably comprises from about 25–100% of an hydroxypropylmethyl cellulose ether having a methoxyl content of from 27–31% and an hydroxypropyl content of from 6–12%, and 0–75% of an inhibited oxidized corn starch.

The batter formulation preferably employed is a farinaceous-based aqueous batter slurry comprising about 50–80%, based on batter mix solids, of a high amylose flour containing at least 50% amylose, based on the starch content of the flour.

DESCRIPTION OF THE PREFERRED EMBODIMENTS

The hydroxypropylmethyl cellulose ethers useful herein are those cellulose ethers having a methoxyl content greater than 22%, preferably 27–31% and an hydroxypropyl content of at least 5%, preferably 6–12%. The 2% aqueous solution viscosity of the useful cellulose ether derivatives is preferably in the range of 3200–5600 cps. The Dow Chemical Company of Midland, Mich. produces a variety of cellulose ether derivatives. Those particularly useful herein are sold under the tradename Methocel E4M and Methocel F4M. Biddle Sawyer of New York City also produces useful cellulose derivatives with the product referred to as Metolose 60SH-4000 being particularly useful herein.

The hydroxypropylmethyl cellulose ethers useful herein may be employed as the sole predust component or may be employed in the form of a blend in an amount greater than 20% by weight of the total predust composition with one or more suitable materials which do not deleteriously effect the freeze/thaw stability and thus the ultimate texture of the pre-fried foodstuff after microwaving. Suitable materials useful in the predust blend include, for example, various modified and unmodified flours and starches, seasonings and flavourants. While unmodified corn flour and corn starch are useful in the blend, a particularly useful modified starch is a sodium hypochlorite-oxidized, adipic-acetic inhibited corn starch obtainable as BATTER BIND® S from National Starch Chemical Corp.

For economic reasons, a predust composition containing as little as 25% of an appropriate hydroxypropylmethyl cellulose ether which provides a microwaveable pre-fried food piece with acceptable freeze/thaw stability is preferably employed.

In order to obtain a freeze/thaw stable pre-fried microwaveable foodstuff of the present invention, any suitable batter formulation capable of providing a pre-fried foodstuff with acceptable crispness after subjection to microwave cooking may be applied to the foodpiece subsequent to predust application. The high amylose flour-containing batters described in U.S. Pat. Nos. 4,529,607 and 4,595,597 (discussed above) are preferably employed.

Suitable high amylose flours useful in the batter formulation are those flours with an amylose content of at least 50%, preferably about 70%, based on the total starch content of the flour. Although high amylose corn flour is preferably employed, high amylose flours derived from sources other than corn which contain concentrations of at least 50% amylose may be employed with similar results expected. Suitable flours would include those flours produced from any high amylose plant species of, for example, wheat, rice, rye, potato, oats, barley, pea, and millet.

Modified or unmodified high amylose flour or combinations of both may be employed in the batter formulation. Typical flour modifications include treatment with heat and/or acids or with oxidizing agents. The flour may also be chemically derivatized by means of esterification or etherification reactions. Preferred modified flours useful herein include acid converted dextrins of high amylose corn flour prepared by conventional techniques known in the art and described in the "Handbook of Water-Soluble Gums and Resins", Robert L. Davidson, editor, McGraw-Hill Book Co., New York (1980), pp. 34–36. It has been found that such dextrinized flour, preferably uncharred after dextrinization, when used in concentrations of about 1 part dextrin to about 4 to 6 parts, preferably 5 parts, of unmodified high amylose flour provide added crispness and improved interface to microwaved pre-fried foodstuffs. In higher concentrations, the dextrinized flour may cause unacceptable lacing resulting in crumbly coatings as well as cause the resultant foodstuff to be unacceptably dark in color. Moreover, when using the higher concentrations, it becomes increasingly difficult to achieve adequate pick up of the batter onto a food piece.

The high amylose flour-containing batter mix useful herein comprises about 50 to 80%, preferably 60–70%, of the high amylose flour, based on dry solids. Any suitable farinaceous material may be employed in conjunction with the high amylose flour. Suitable materials include starches derived from such sources as corn, sago, wheat, rice, potato, sweet potato, waxy maize, high amylose corn, tapioca, sorghum, or waxy sorghum starch, as well as components from these starches, viz, amylose and amylopectin. Derivatives of the above including esterified, etherified, inhibited, and converted starches are also applicable herein. Furthermore, flours derived from such sources as, for example, corn, wheat, or potato are also suitable in the batter compositions.

In the preparation of the batter, the practitioner need merely prepare an aqueous slurry of the dry mix. The slurry will ordinarily contain about 100 parts by weight of dry mix per 125 to 175 parts of water. The precise dry mix to water ratio will depend, of course, upon the type of foodstuff being prepared, the manner in which the batter mix is to be applied, and the particular mix composition being utilized. It is unnecessary to heeat the batter mix slurry prior to its application of the foodstuff. The practioner may add such seasoning, extenders, preservatives, or food colors to the batter mix slurry as are desired. The slurry is then kept under agitation prior to its application to the foodstuff so as to prevent settling from occurring.

This invention encompasses the preparation of batter-coated foodstuffs which do not contain breading, referred to in the art as having a tempura type coating. The process of applying breading to batter coated foodstuffs is also encompassed, herein referred to as single-pass coating. Common breading mixtures employed in such single-pass applications include bread crums, corn meal, cracker crumbs and the like.

In the process of the present invention, a thin uniform coating of the dry predust composition is applied to the food piece which may be either fresh, par-boiled, or frozen, with residual predust being removed by shaking or agitation.

In order to assure adequate pick-up, some food pieces with little or no surface moisture may be dipped in water prior to the predust application step.

After predusting, a suitable aqueous batter slurry is applied to the food piece by any convenient procedure such as by dipping, spraying or cascading.

After draining off the excess batter, breading may optionally be applied before the foodstuff is pre-fried. The foodstuff need only be fried for a period of about 0.5–1.5 minutes depending on the foodstuff, preferably 0.5–1.0 minutes.

Thereafter the foodstuff is frozen to a temperature preferably between 0° and 15° F. (−17° to −9.5° C.)

Pre-fried foodstuffs which will benefit from the present invention includes fish, shell fish, poultry, meat and vegetable products including fish sticks, fish fillets, fish steaks, whole fish, scallops, oysters, clamps, shrimp, lobster parts, chicken and turkey parts, veal, beef, pork, egg plant, and onion rings.

The examples which follow will further illustrate the embodiment of the present invention. In the examples, all parts are given by weight and all temperatures are given in both degrees Fahrenheit and Celsius.

Unless otherwise indicated, the following severe test procedure was used in order to evaluate the ability of various predust compositions to provide freeze/thaw stability to a microwaveable pre-fried foodstuff.

Chicken thighs are par-boiled for twenty minutes. After cooling the thighs to a temperature at which they can be easily handled, the chicken is deskinned, dunked in ambient temperature water and thereafter the predust to be evaluated is evenly applied to each piece with any excess predust shaken free. The pieces are then dipped in an aqueous batter slurry allowing all the excess batter to run off. The batter coated pieces are pre-fried in oil at 385° F. (196° C.) for 1 minute, drained, placed in individual aluminum containers, covered and then frozen in a freezer maintained at 0° F. (−17° C.) for a minimum of about 12 hours. After completion of the initial freezing period, the chicken pieces are thawed at room temperature for four hours and then refrozen, thus completing one freeze/thaw cycle. Freeze periods (at least 12 hours) and thaw periods (4 hours) are repeated for 5 cycles. After each cycle, one frozen sample is microwaved for about 1.5–2 minutes until an internal temperature of 150° F. (66° C.) is attained. Each sample is allowed to stand for 1 minute prior to being evaluated. An acceptable product has an interface which is preferably floury or bready and not pasty. An acceptable product also has a coating which is thin and which offers resistance upon application of pressure as opposed to being thick and wet to the touch and which leaves an impression where pressure is applied. The test is continued until an unacceptable product is obtained. The number of successful cycles completed before the predust fails is recorded for each sample. It is to be understood that this test is a relative indication of stability.

EXAMPLE 1

This example illustrates the improved freeze/thaw stability of a microwaveable pre-fried foodpiece employing the predust of the present invention.

The predusts evaluated contained 0–100% of an hydroxypropylmethyl cellulose (HPMC) having an average methoxyl content of 29% and an average hydroxypropyl content of 10%, and 100–0% of an oxidized inhibited corn starch.

A batter formulation capable of providing an acceptably crisp texture to a pre-fried foodstuff which is frozen and subsequently microwaved was prepared which contained the following ingredients.

| INGREDIENTS | PARTS IN BATTER RECIPE |
|---|---|
| High Amylose Corn Flour* | 50 |
| Dextrinized High Amylose Corn Flour** | 10 |
| Wheat Flour | 38 |
| Acid Sodium Aluminum Phosphate | 1 |
| Sodium Bicarbonate | 1 |
| Water | 160 |

*The flour contained approximately 70% amylose.
**Acid converted dextrin of a flour containing approximately 70% amylose.

Chicken thighs were prepared as described above. The texture of the samples was evaluated after microwaving subsequent to undergoing repeated freeze/thaw cycles with the results indicated in Table I.

TABLE I

| Predust Composition | | Freeze/Thaw |
|---|---|---|
| % HPMC* | % Starch** | Cycles |
| 0 | 100 | 0 |
| 5 | 95 | 0 |
| 15 | 85 | 0 |
| 20 | 80 | 2 |
| 25 | 75 | 4 |
| 50 | 50 | 4 |
| 75 | 25 | 4 |

TABLE I-continued

| Predust Composition | | Freeze/Thaw |
|---|---|---|
| % HPMC* | % Starch** | Cycles |
| 100 | 0 | 4 |

*DOW METHOCEL E4M (obtained from the Dow Chemical Company)
**BATTER BIND ®S (obtainable from National Starch and Chemical Corp.)

The results show that the hydroxypropylmethyl cellulose ether, when present in the predust composition in an amount greater than 20%, provided microwaveable pre-fried foodstuffs which were capable of withstanding repeated freeze/thaw cycles. No significant improvement was provided when amounts greater than about 25% of the hydroxypropylmethyl cellulose was employed.

EXAMPLE 2

This example illustrates the effect of employing other cellulose derivatives in a predust composition in a 25% concentration and their effect on providing a freeze/thaw stability to a microwaveable pre-fried foodstuff.

Chicken thighs were prepared as described above. The texture of the samples were evaluated after microwaving subsequent to undergoing repeated freeze/thaw cycles with the results indicated in Table II.

TABLE II

| Cellulose Derivative Employed in Predust* | Freeze/Thaw Cycles |
|---|---|
| Dow Methocel E4M (HMPC containing 29% methoxyl, 10% hydroxypropyl) | 5 |
| Dow Methocel F4M (HPMC containing 29% methoxyl, 6% hydroxypropyl) | 3 |
| Biddle Sawyer Metolose 60SH-4000 (HPMC containing 29% methoxyl, 10% hydroxypropyl) | 5 |
| Dow Methocel K4M** (HPMC containing 22% methoxyl, 8% hydroxypropyl) | 2 |
| Dow Methocel A4M** (methylcellulose) | 2 |
| Hercules Klucel HF** (hydroxypropyl cellulose) | 0 |
| Hercules Klucel GF** (hydroxypropyl cellulose) | 0 |
| Hercules CMC 7H4XF** (carboxymethyl cellulose) | 2 |
| Hercules CMC 7HXF** (carboxymethyl cellulose) | 0 |

*Present in a concentration of 25% with the remaining 75% comprising BATTER BIND ®S.
**Comparative The results show that a predust containing the hydroxypropyl cellulose ether derivatives having an average methoxyl content of about 29% provided superior freeze/thaw stability to microwaveable pre-fried foodstuffs in comparison to predusts containing other cellulose derivatives including an hydroxypropylmethyl cellulose ether having a lower methoxyl content.

EXAMPLE 3

This example illustrates the use of a predust composition containing a useful hydroxypropylmethyl cellulose in a blend with other optional materials.

Chicken thighs were prepared as described above. The texture of the samples was evaluated after microwaving subsequent to undergoing repeated freeze/thaw cycles. The results may be found in Table III.

TABLE III

| HPMC* Predust Blend | Freeze/Thaw Cycles |
|---|---|
| 25% HPMC and 75% BATTERBIND ®S | 4 |
| 25% HPMC and 75% Corn Flour | 4 |
| 25% HPMC and 75% Corn Starch | 3 |
| 25% HPMC and 75% Wheat Flour | 0 |

*Dow Methocel E4M

The results show that corn flour and corn starch are also useful in a predust blend with the hydroxypropylmethyl cellulose. Wheat flour present in a high level in the blend had a deleterious effect on the freeze/thaw stability provided by the cellulose derivative.

EXAMPLE 4

This example illustrates that in order to provide acceptable freeze/thaw stable microwaveable products, the predust of the present invention must be employed in combination with a batter formulation capable of providing acceptable crispness to a pre-fried foodstuff after subjection to microwave cooking.

A predust containing 25% METHOCEL E4M and 75% BATTER BIND ® S was applied to chicken thighs. Thereafter the pieces were coated with an aqueous batter mix slurry and evaluated as described above. The batter mix compositions and the freeze/thaw results may be found in Table IV.

TABLE IV

| | PARTS BATTER MIX RECIPE | | | |
|---|---|---|---|---|
| INGREDIENTS | A | B | C | D |
| High Amylose Corn Flour$^a$ | 50 | 0 | 0 | 0 |
| Dextrinized High Amylose Corn Flour$^b$ | 10 | 0 | 0 | 0 |
| Wheat Flour | 38 | 97 | 0 | 47 |
| Corn Flour | 0 | 0 | 97 | 50 |
| Acid Sodium Aluminum Phosphate | 1 | 1.5 | 1.5 | 1.5 |
| Sodium Bicarbonate | 1 | 1.5 | 1.5 | 1.5 |
| Water | 160 | 160 | 160 | 160 |
| Texture After 0 F/T Cycles | good | poor | fair$^c$ | poor |
| Texture After 1 F/T Cycle | good | poor | poor | poor |

$^a$The flour contained approximately 70% amylose.
$^b$Acid converted dextrin of a flour containing approximately 70% amylose.
$^c$The sample had a crisp surface texture with an unacceptable pasty interface.

Summarizing, the present invention provides a process for preparing a freeze/thaw stable batter coated, pre-fried microwaveable foodstuff. Variations may be made in proportions, procedures, and materials without departing from the scope of this invention which is defined by the following claims.

We claim:

1. A dry predust composition for the preparation of a freeze/thaw stable batter coated, pre-fried microwaveable foodstuff comprising greater than 20%, by weight, of an hydroxypropylmethyl cellulose ether having a methoxyl content greater than 22% and an hydroxypropyl content of at least about 5%, said predust composition applied to the outer surface of a foodstuff prior to the application of an aqueous batter slurry whereby said predusted, batter coated pre-fried foodstuff possesses improved freeze/thaw stability and exhibits an acceptable crispness after microwave cooking.

2. The predust composition of claim 1, wherein said hydroxypropylmethyl cellulose ether has a methoxyl content of 27–31% and an hydroxypropyl content of 6–12%, and said aqueous battery slurry comprising 50–80%, based on batter solids, of a high amylose flour containing at least 50% amylose, based on the starch content of said high amylose flour.

3. The predust composition of claim 2, wherein said predust comprises about 25 to 100% of the hydroxypropylmethyl cellulose ether and 75-0% of a farinaceous material selected from the group consisting of a modified or unmodified flour, a modified or unmodified starch, and mixtures thereof.

4. The predust composition of claim 3, wherein the farinaceous material is unmodified corn flour or corn starch.

5. The predust composition of claim 3, wherein the farinaceous material is an oxidizied, inhibited corn starch.

6. The predust composition of claim 5, wherein the hydroxypropylmethyl cellulose is present in an amount of about 25% and the oxidized, inhibited corn starch is present in an amount of about 75%.

* * * * *